US010831797B2

(12) United States Patent
Trim et al.

(10) Patent No.: US 10,831,797 B2
(45) Date of Patent: Nov. 10, 2020

(54) QUERY RECOGNITION RESILIENCY DETERMINATION IN VIRTUAL AGENT SYSTEMS

(71) Applicant: INTERNATIONAL BUSINESS MACHINES CORPORATION, Armonk, NY (US)

(72) Inventors: Craig M. Trim, Sylmar, CA (US); Peter C. Boyle, British Columbia (CA); Brenda Haddock, Indianapolis, IN (US); Maria Wittnebert, Ridgewood, NJ (US); Eniko I. Rozsa, Coquitlam (CA); Diman Ghazi, Vancouver (CA); Abhishek Basu, Kolkata (IN); Xavier Verges Farrero, Barcelona (ES)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 134 days.

(21) Appl. No.: 16/009,772

(22) Filed: Jun. 15, 2018

(65) Prior Publication Data
US 2019/0294725 A1    Sep. 26, 2019

(30) Foreign Application Priority Data
Mar. 23, 2018  (EP) .................................... 18382199

(51) Int. Cl.
*G06F 17/28*  (2006.01)
*G06F 16/332*  (2019.01)
(Continued)

(52) U.S. Cl.
CPC ........ *G06F 16/3329* (2019.01); *G06F 11/321* (2013.01); *G06F 11/3409* (2013.01); *G06F 16/3325* (2019.01)

(58) Field of Classification Search
CPC ........... G06F 16/3329; G06F 16/33525; G06F 11/321; G06F 16/3344; G06F 17/28
(Continued)

(56) References Cited

U.S. PATENT DOCUMENTS 6,430,557 B1 * 8/2002 Gaussier ............. G06F 16/3338
6,751,600 B1 * 6/2004 Wolin ................... G06F 16/353
706/12
(Continued)

FOREIGN PATENT DOCUMENTS

CN    101111837 A    1/2008
CN    102063468 A    5/2011
(Continued)

OTHER PUBLICATIONS

International Search Report and Written Opinion of the International Searching Authority dated Jun. 19, 2019 in PCT Application No. PCT/IB2019/051108, 9 pages.
(Continued)

*Primary Examiner* — Jakieda R Jackson
(74) *Attorney, Agent, or Firm* — James Nock; Andrew D. Wright; Roberts, Calderon, Safran & Cole, P.C.

(57) ABSTRACT

A computer-implemented method includes: generating, by a computing device, a sample of a query, wherein the query maps to a predetermined categorization; processing the sample with a first natural language process, wherein the processing produces an output comprising a categorization of the sample; storing data regarding whether the categorization of the output matches the predetermined categorization; generating a report based on the stored data indicating a percentage of a plurality of samples of the query whose categorizations match the predetermined characterization; outputting the report; and receiving a second natural language process comprising updates to the first natural lan-
(Continued)

guage process based on the report, wherein the updates increase the percentage of the plurality of samples that match the predetermined categorization when processed with the second natural language process relative to when the plurality of samples was processed with the first natural language process.

25 Claims, 11 Drawing Sheets

(51) Int. Cl.
  *G06F 11/32* (2006.01)
  *G06F 11/34* (2006.01)
(58) Field of Classification Search
  USPC .......................................................... 704/9
  See application file for complete search history.

(56) References Cited

U.S. PATENT DOCUMENTS

| | | | | |
|---|---|---|---|---|
| 6,888,548 | B1* | 5/2005 | Gallivan | G06T 11/20 345/440 |
| 8,156,060 | B2 | 4/2012 | Borzestowski et al. | |
| 9,530,098 | B2 | 12/2016 | Antebi et al. | |
| 9,824,188 | B2 | 11/2017 | Brown et al. | |
| 2002/0196679 | A1* | 12/2002 | Lavi | G06F 40/30 365/200 |
| 2003/0061132 | A1* | 3/2003 | Yu, Sr. | G06Q 30/0205 705/30 |
| 2003/0101449 | A1* | 5/2003 | Bentolila | G06Q 30/0255 725/10 |
| 2004/0111349 | A1* | 6/2004 | Charnley, Jr. | G06Q 40/04 705/36 R |
| 2007/0112803 | A1* | 5/2007 | Pettovello | G06F 16/134 |
| 2007/0282649 | A1* | 12/2007 | Davis | G06F 11/008 700/29 |
| 2008/0082511 | A1* | 4/2008 | Williams | G06F 16/3322 |
| 2008/0154842 | A1* | 6/2008 | Huras | G06F 16/284 |
| 2008/0183699 | A1* | 7/2008 | Hu | G06F 16/9535 |
| 2009/0089044 | A1* | 4/2009 | Cooper | G06F 40/30 704/9 |
| 2011/0119196 | A1* | 5/2011 | Ventura | G06Q 30/016 705/304 |
| 2011/0213777 | A1* | 9/2011 | Sun | G06F 16/353 707/740 |
| 2013/0332244 | A1* | 12/2013 | Gifford | G06Q 10/063 705/7.38 |
| 2014/0188862 | A1* | 7/2014 | Campbell | G06F 16/248 707/728 |
| 2015/0149461 | A1* | 5/2015 | Aguilar Lemarroy | G06F 16/35 707/737 |
| 2015/0186354 | A1* | 7/2015 | Kim | G06F 40/20 704/9 |
| 2015/0310526 | A1* | 10/2015 | Warren | G06F 16/951 705/26.62 |
| 2015/0310527 | A1* | 10/2015 | Warren | G06Q 30/0623 705/26.62 |
| 2015/0324494 | A1 | 11/2015 | Iorio et al. | |
| 2015/0332672 | A1* | 11/2015 | Akbacak | G10L 15/18 704/257 |
| 2016/0047942 | A1* | 2/2016 | Chorn | G01V 99/005 702/2 |
| 2016/0078507 | A1* | 3/2016 | Shivaswamy | G06Q 30/0605 705/26.2 |
| 2016/0098393 | A1* | 4/2016 | Hebert | G06F 17/28 704/9 |
| 2016/0110422 | A1* | 4/2016 | Roytman | G06N 5/00 706/12 |
| 2016/0378762 | A1* | 12/2016 | Rohter | H04N 21/4622 707/728 |
| 2017/0083574 | A1* | 3/2017 | Chung | G06F 16/22 |
| 2017/0140429 | A1* | 5/2017 | Cheng | G06F 16/3329 |
| 2017/0148073 | A1 | 5/2017 | Nomula et al. | |
| 2017/0177642 | A1* | 6/2017 | Burger | G06F 16/24542 |
| 2017/0317893 | A1* | 11/2017 | Goldstein | H04L 41/5003 |
| 2017/0364520 | A1* | 12/2017 | Venkataraman | G06F 16/3329 |
| 2018/0240256 | A1* | 8/2018 | Mayer | G06T 11/206 |
| 2018/0293484 | A1* | 10/2018 | Wang | G06N 3/006 |
| 2019/0236187 | A1* | 8/2019 | Fitchett | G06F 16/24542 |

FOREIGN PATENT DOCUMENTS

| | | |
|---|---|---|
| CN | 102999521 A | 3/2013 |
| CN | 104050240 A | 9/2014 |
| CN | 105095187 A | 11/2015 |

OTHER PUBLICATIONS

Mell et al., "The NIST Definition of Cloud Computing", NIST, Special Publication 800-145, Sep. 2011, 7 pages.

* cited by examiner

QUERY RECOGNITION RESILIENCY DETERMINATION IN VIRTUAL AGENT SYSTEMS

BACKGROUND

The present invention generally relates to determining query recognition resiliency and, more particularly, to determining query recognition resiliency in virtual agent systems.

A user may use a user computer device to interact with a virtual support agent (e.g., a chat bot, automated support agent, or the like) to obtain information or assistance for a technical issue (e.g., to reset a password, make changes to a service account, etc.). A virtual support agent system (referred to as an "agent" or "agent system") and a user may engage in a dialogue in which the agent asks questions to determine the user's issues and provide the user with a solution. When a user provides a query to an agent, the agent should respond appropriately to the query. The agent system responds by determining the intent of the query and using the determined intent to find a corresponding activity or follow-up questions to present as part of a dialogue.

The user's intent when providing responses to an agent's questions can be determined using Natural Language Processing (NLP) of the user queries. Natural Language is both infinite and ambiguous. No matter how clever the virtual agent system, or how deep the learning, any system may fail. It is possible that virtual agent systems may fail to correctly interpret even basic or rudimentary queries. For example, a query may be correctly recognized and correctly classified, but a slight alteration to the query may not be correctly classified by a virtual agent system. As an example, an alteration may be as simple as adding structural words, such as prepositions, articles and other parts of speech that do not typically contribute to content. Additionally, or alternatively, the alteration may be in inclusion of verbs, nouns and other content words that—while they contribute semantic meaning—do not pose any significant contribution to how the query should be interpreted.

SUMMARY

In an aspect of the invention, a computer-implemented method includes: generating, by a computing device, a sample of a query, wherein the query maps to a predetermined categorization; processing, by the computing device, the sample with a first natural language process, wherein the processing produces an output comprising a categorization of the sample; storing, by the computing device, data regarding whether the categorization of the output matches the predetermined categorization; generating, by the computing device, a report based on the stored data indicating a percentage of a plurality of samples of the query whose categorizations match the predetermined characterization; outputting, by the computing device, the report; and receiving, by the computing device, a second natural language process comprising updates to the first natural language process based on the report, wherein the updates increase the percentage of the plurality of samples that match the predetermined categorization when processed with the second natural language process relative to when the plurality of samples was processed with the first natural language process. In a further aspect, the predetermined categorization is a first predetermined categorization, and the method further includes: processing a plurality of query samples associated with a second predetermined categorization with the natural language process to generate respective outputs indicating whether respective categorizations of each of the plurality of query samples associated with the second predetermined categorization match the second predetermined categorization.

In an aspect of the invention, there is a computer program product for updating a natural language process associated with a virtual agent system based on the resiliency of user queries, the computer program product comprising a computer readable storage medium having program instructions embodied therewith. The program instructions are executable by a computing device to cause the computing device to: generate a plurality of query samples based on a query that maps to a predetermined categorization; process each of the plurality of query samples with a first natural language process, wherein the processing produces respective outputs comprising respective categorizations for each of the plurality of query samples; store data regarding whether the respective categorizations for each of the plurality of query samples matches the predetermined categorization; generate a report based on the stored data indicating a percentage of the plurality of query samples that have categorizations that match the predetermined characterization; output the report; and receive a second natural language process comprising updates to the first natural language process based on the report, wherein the updates increase the percentage of the plurality of query samples that match the predetermined categorization when processed with the second natural language process relative to the first natural language process. In a further aspect, the predetermined categorization is a first predetermined categorization, and the program instructions further cause the computing device to: process a plurality of query samples associated with a second predetermined categorization with the natural language process to generate respective outputs indicating whether respective categorizations of each of the plurality of query samples associated with the second predetermined categorization match the second predetermined categorization.

In an aspect of the invention, a system includes: a CPU, a computer readable memory and a computer readable storage medium associated with a computing device; program instructions to select a predetermined categorization to analyze for resiliency; program instructions to select a query associated with the predetermined categorization; program instructions to alter the query to produce a query sample; program instructions to apply a first natural language process to process the query sample; program instructions to store an output of the processed query sample, wherein the output indicates whether a categorization of the processed query sample matches the predetermined categorization; program instructions to generate a report based on the stored data indicating a variance for the predetermined categorization based on the output of the processed query sample and respective outputs of a plurality of other query samples associated with the predetermined categorization; program instructions to output the report; and program instructions to receive a second natural language process comprising updates to the first natural language process based on the report, wherein the updates increase the percentage of the plurality of query samples that match the predetermined categorization when processed with the second natural language process relative to the first natural language process. The program instructions are stored on the computer readable storage medium for execution by the CPU via the computer readable memory. In a further aspect, the altering the query includes appending a term to the query. In a further aspect, the system includes program instructions to select the term from a database of terms associated with the categorization.

In an aspect of the invention, a computer implemented method includes: altering, by a computing device, a query associated with a predetermined categorization to produce a query sample; applying, by the computing device, a first natural language process to process the query sample; storing, by the computing device, an output of the processed query sample, wherein the output indicates whether a categorization of the processed query sample matches the predetermined categorization; generating, by the computing device, a report based on the stored data indicating a variance for the predetermined categorization based on the output of the processed query sample and respective outputs of a plurality of other query samples associated with the predetermined categorization; outputting, by the computing device, the report; and receiving, by the computing device, a second natural language process comprising updates to the first natural language process based on the report, wherein the updates increase the percentage of the plurality of samples that match the predetermined categorization when processed with the second natural language process relative to when the plurality of samples was processed with the first natural language process. In a further aspect, the altering the query includes appending a term to the query.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
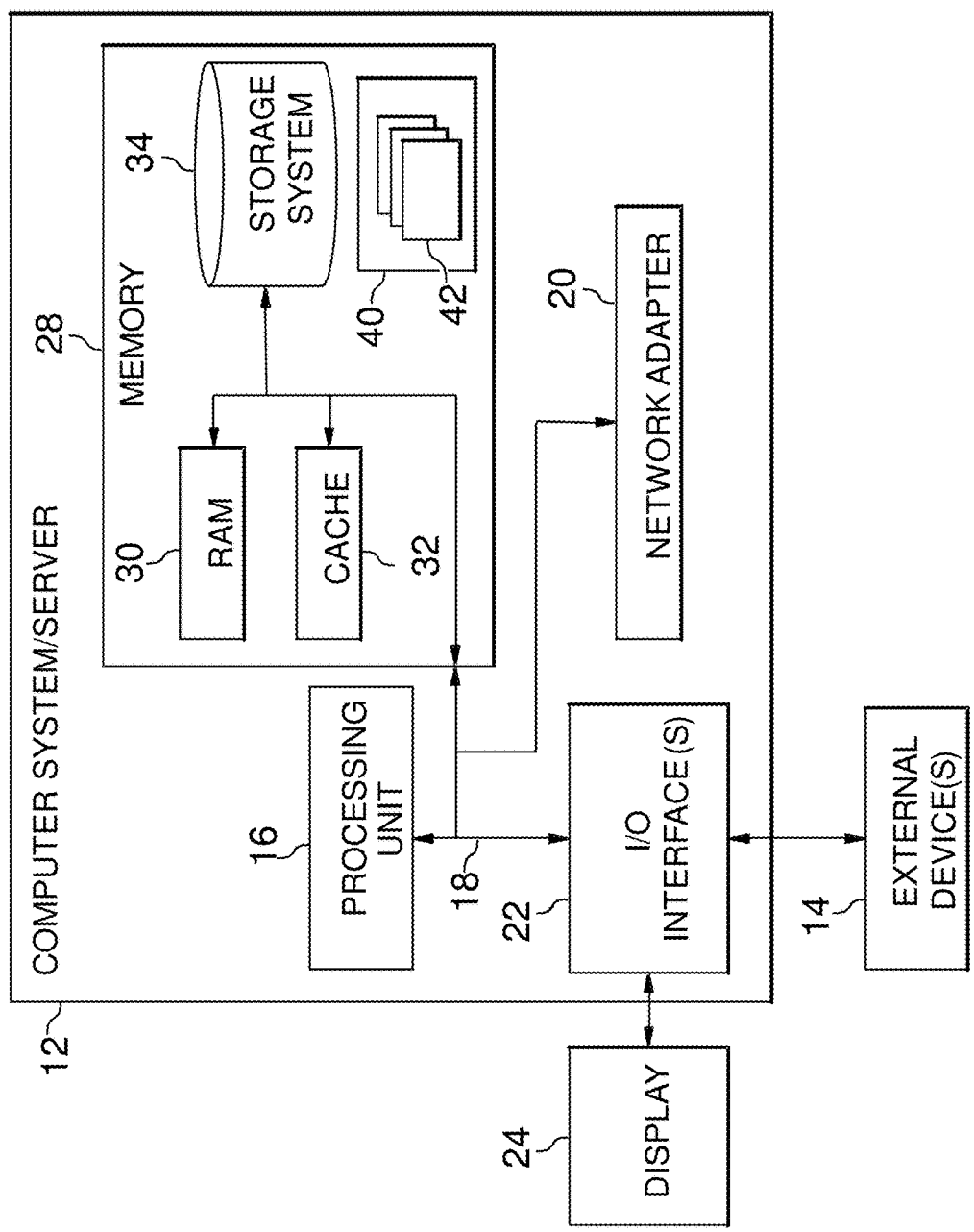
FIG. 1 depicts a cloud computing node according to an embodiment of the present invention.

The present invention generally relates to determining query recognition resiliency and, more particularly, to determining query recognition resiliency in virtual agent systems. In a virtual agent system, a user query may be correctly recognized and correctly classified, but a slight alteration to the query (e.g., by the inclusion of structural words, verbs, nouns and/or other content words) may not be correctly recognized and classified by the virtual agent system (also referred to herein as an "agent"). Accordingly, aspects of the present invention may determine recognition resiliency for different user queries or user problem statements presented by users when using a virtual support agent system. More specifically, aspects of the present invention may determine the "resiliency" of a user query by determining a percentage of times that a user query is incorrectly recognized and classified when the user query is altered.

As an illustrative example, the user query "I need to reset my password" may be recognized correctly by the agent, but the query "I need help resetting my sys password" may not be correctly recognized. Aspects of the present invention may analyze user queries and determine the resiliency of each user query. Further, aspects of the present invention may provide information that identifies the resiliency of each user query. In this way, system administrators and/or natural language processing developers may identify user queries that have a relatively low resiliency (e.g., high error rates when queries are altered). Based on resiliency information, limited computing and developer resources may be focused to improving the recognition of queries having low resiliency. As such, computing and developer resources are more efficiently allocated and are not wasted to improve the recognition of queries having high resiliency.

As described herein, aspects of the present invention may determine the resiliency of a user query with a predetermined correct recognition or classification, and iteratively alter the user query by adding structural words, verbs, nouns and/or other content words to a user query. Each time the user query is altered, aspects of the present invention may determine if the altered user query is recognized correctly. For a specific user query, the user query may be altered (or sampled) any number of times (e.g., tens, hundreds, or potentially thousands of times). Each time the user query is altered, aspects of the present invention may track whether the altered query is correctly categorized, and a metric is determined for the category that indicates a percentage variation or resiliency indicating how often user queries relating to that category are correctly categorized after being altered.

As an illustrative example, assume that an agent system is preconfigured to categorize the user query "mobile token" as "mobile token generation" so that when the agent receives the query "mobile token," the agent is preconfigured to generate a mobile token and respond in accordance with the determined category. Aspects of the present invention may "sample" or alter the preconfigured or predetermined user query "mobile token" to "mobile token quartern" and determine if this altered user query is correctly categorized and recognized as "mobile token generation." Aspects of the present invention may continue to sample the user query by appending or modifying the user query with various structural words, verbs, nouns and/or other content words. The appended words are not completely random or "nonsense" words, rather, they are selected from a content word database to reflect actual words that a user may include as part of a user query. As the user query is altered, aspects of the present invention may track the number of times the altered queries are correctly recognized and categorized. For each category, a metric is calculated that indicates the resiliency of user queries that are correctly categorized. More specifically, the metric may indicate a percentage variation or a percentage in which the user queries related to the category are incorrectly classified. In this way, natural language processes to correctly categorize queries with low resiliencies can be focused on for improvement by developers such that recognition of user queries relating to those categories can be improved. More specifically, aspects of the present invention result in updates to natural language processes to improve query recognition and more accurately categorize user queries. That is to say, the percentage of query samples that are correctly categorized by an updated natural language process is increased relative to when those samples are processed by the natural language process prior to the updates.

In embodiments, updates to natural language processes may be targeted to improve low resiliency categories. Aspects of the present invention may identity low resiliency categories so that developers may focus on improving natural language processes to improve recognition of queries associated with low resiliency categories. Additionally, or alternatively, aspects of the present invention may automatically update natural language processes for improving the recognition of queries associated with low resiliency categories. For example, for a query that is below a resiliency threshold, aspects of the present invention may find key phrases within the query/queries for that query for queries that are well recognized, perform a general corpora search (e.g., using any suitable searching tool) using those keywords, and create a language model over the results of the search. For n-grams with a suitable term frequency-inverse document frequency (TF-IDF), aspects of the present invention may perform a vector space analysis for similarity back to the original key phrase(s). For similarity matches over a policy threshold, aspects of the present invention may incorporate these queries into a ground truth. With the updated ground truth, aspects of the present invention may perform an automated update of the original query to flow mapping.

Aspects of the present invention may provide a technical solution to the technical problem of improving user query recognition in virtual agent systems. In particular, aspects of the present invention may iteratively sample user queries with predetermined categorizations, process the sampled or altered user queries through natural language processing systems, and track the output of the altered user queries to determine the resiliency of the user query. Aspects of the present invention may sample a user query tens, hundreds, or potentially thousands of times and provide the altered user queries as inputs to a natural language processing system. As such, aspects of the present invention are necessarily computer based and may not be performed by pen and paper. Further, aspects of the present invention improve the performance of a computing system hosting a virtual agent system by reducing the consumption of computing resources. Specifically, aspects of the present invention reduce the consumption of computing resources by identifying user queries and categorizations having low resiliency such that computing resources are not unnecessarily wasted on analyzing or modifying natural language processing on user queries having high resiliency or accuracy. That is to say, aspects of the present invention more efficiency allocates the usage of computing resources.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
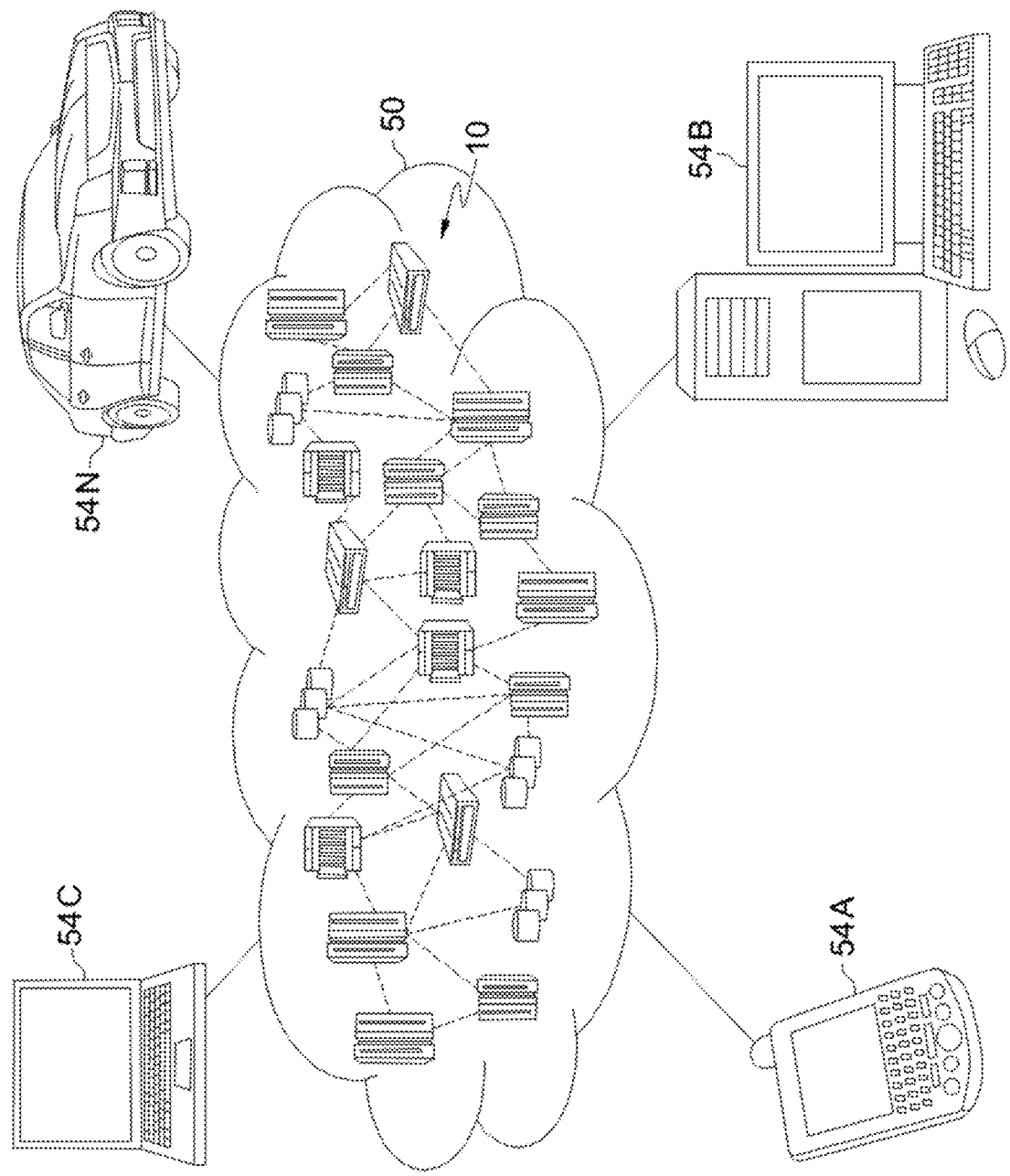
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
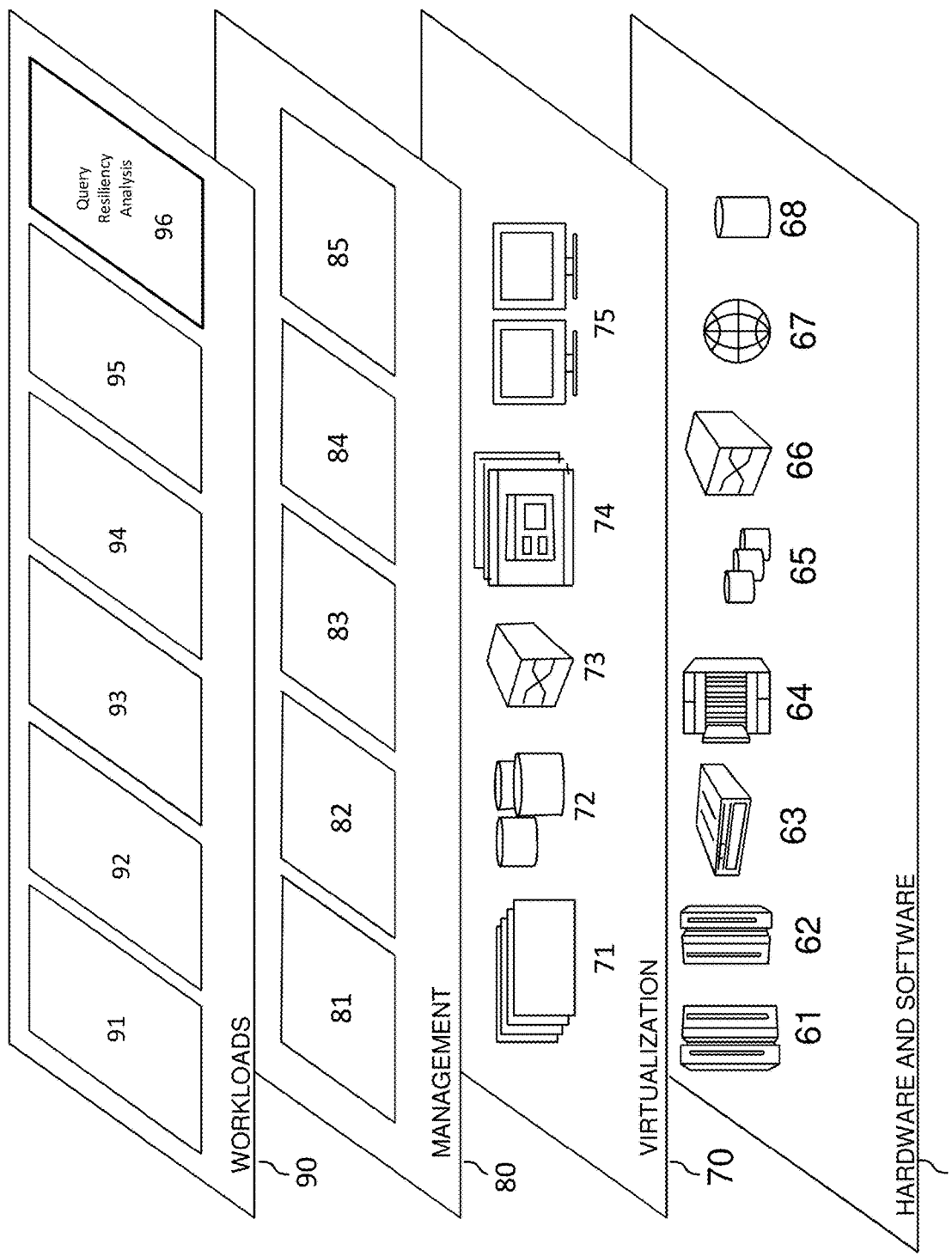
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and query resiliency analysis 96.

Referring back to FIG. 1, the program/utility 40 may include one or more program modules 42 that generally carry out the functions and/or methodologies of embodiments of the invention as described herein (e.g., such as the functionality provided by query resiliency analysis 96). Specifically, the program modules 42 may sample a query, process the sampled query, determine the resiliency of a query based on comparing a categorization of a processed sampled query with a categorization of a non-sampled query, and generate and output a report indicating the resiliency of the query. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a query resiliency analysis system 220 as shown in FIG. 4.

Figure 4:
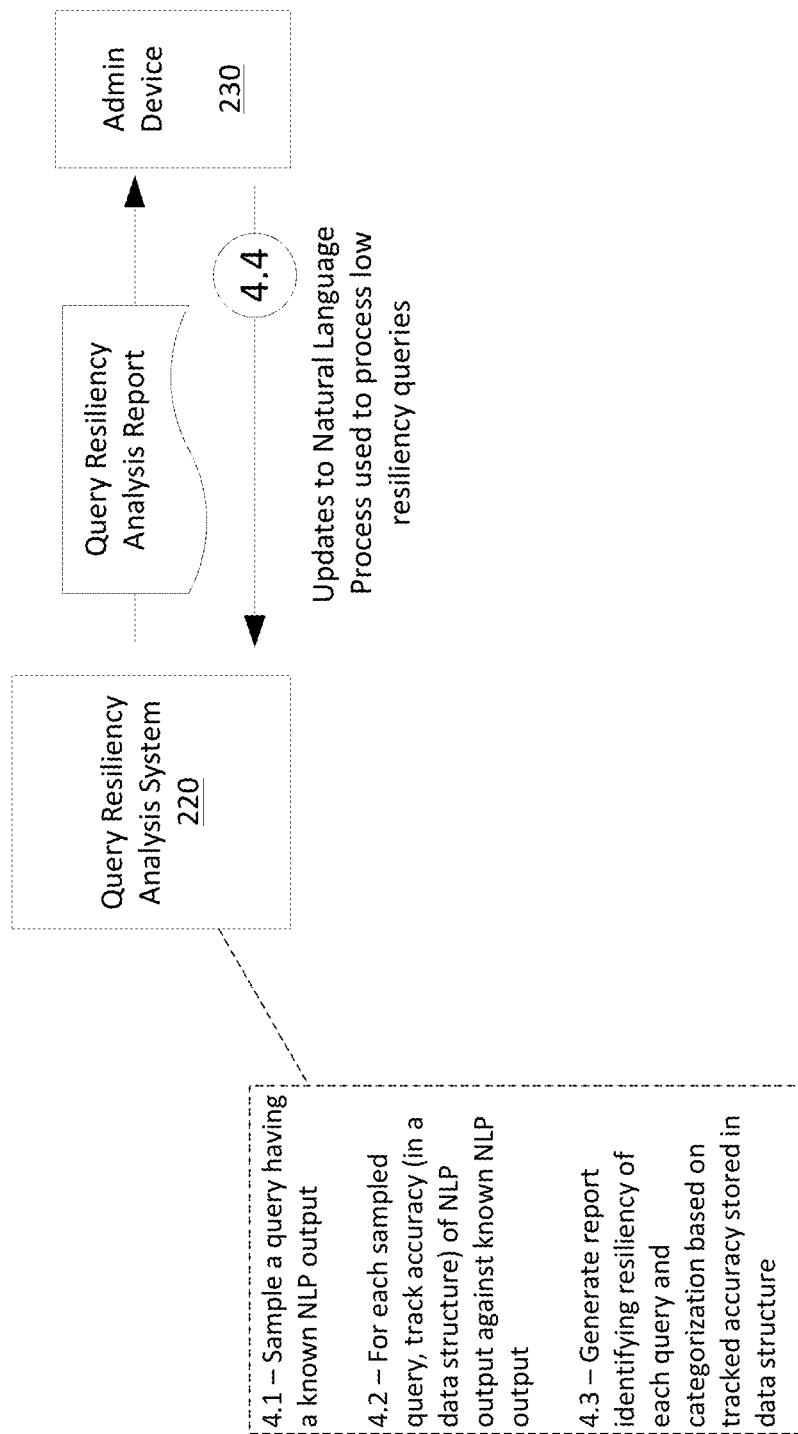
FIG. 4 shows an overview of an example implementation in accordance with aspects of the present invention.

FIG. 4 shows an overview of an example implementation in accordance with aspects of the present invention. As shown in FIG. 4, a query resiliency analysis system 220 may generate and output a query resiliency analysis report to an admin device 230. In embodiments, the query resiliency analysis system 220 may generate the report by sampling a query that has a predetermined natural language processing (NLP) output (step 4.1). For example, the query resiliency analysis system 220 may sample a query by altering the query and processing the altered query using natural language processing. The query resiliency analysis system 220 may sample a query any number of times in any number of ways by altering the query and appending different structural words, verbs, nouns and/or other content words to the query. The output of a sampled query may include a categorization of the sampled query.

At step 4.2, for each sampled query, the query resiliency analysis system 220 may track and store data regarding the accuracy (e.g., in a data structure) of the NLP output of the sampled query (e.g., a determined categorization) against a previously determined or predetermined NLP output of the non-sampled or non-altered query (e.g., the predetermined correct categorization). As described in greater detail herein, the data structure may identify a query, a number of times the query was sampled, and the determined categorization (e.g., the NLP output) of each sampled query. For each predetermined categorization, different queries may be sampled (e.g., altered and processed with NLP techniques). The data structure may store data that identifies the NLP output for each sampled query and a percentage of correctly categorized queries against a given categorization. In this way, the resiliency of each categorization can be determined based on the accuracy to which processed sampled queries correctly match the given correct categorization.

At step 4.3, the query resiliency analysis system 220 may generate a report of identifying the resiliency of each query and categorization based on the data stored in the data structure (generated at step 4.2). In embodiments, the report may be in the form of a graph that displays the variation or resiliency of each categorization in ascending or descending order. In this way, high variation/low resiliency categorizations may be identified and computing/developmental resources may be allocated to improving the recognition of queries associated with high variation/low resiliency categorizations. For example, as shown in FIG. 4, the admin device 230 may receive the report. An administrator or team of administrators may view the report, identify the high variation/low resiliency categorizations from the report and target the high variation/low resiliency categorizations for updates to natural language processes such that an agent system may better recognize queries associated with the high variation/low resiliency categorizations.

As shown in FIG. 4, the admin device 230 may provide updates to the query resiliency analysis system 220 (at step 4.4.) in which the updates are based on the information from the query resiliency analysis report. More specifically, the updates may include updates to a natural language process used to recognize user queries such that the updated natural language process more accurately categorizes user queries. In other words, the percentage of query samples that are correctly categorized by an updated natural language process is increased relative to when those samples are processed by the natural language process prior to the updates. In this way, the information from query resiliency analysis report is used to improve agent recognition of user queries that have low resiliency. That is to say, the information from query resiliency analysis report is used to improve the resiliency of user queries and categorizations.

Figure 5:
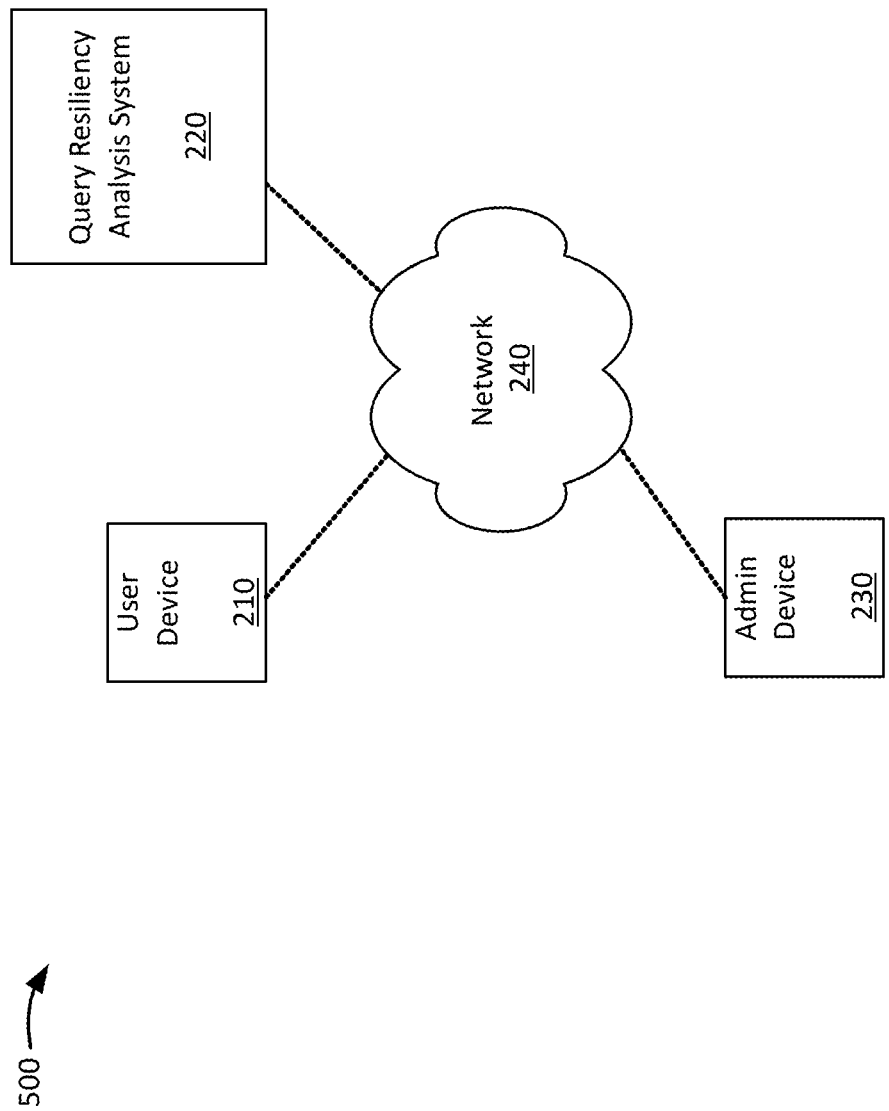
FIG. 5 shows an example environment in accordance with aspects of the present invention.

FIG. 5 shows an example environment in accordance with aspects of the present invention. As shown in FIG. 5, environment 500 may include a user device 210, query resiliency analysis system 220, admin device 230 and network 240. In embodiments, one or more components in environment 500 may correspond to one or more components in the cloud computing environment of FIG. 2. In embodiments, one or more components in environment 500 may include the components of computer system/server 12 of FIG. 1.

The user device 210 may include a device capable of communicating via a network, such as the network 240. For example, the user device 210 may correspond to a mobile communication device (e.g., a smart phone or a personal digital assistant (PDA)), a portable computer device (e.g., a laptop or a tablet computer), a desktop computer, a server computer, or another type of computing device. In some embodiments, the user device 210 may be used to access a virtual support agent system (e.g., hosted by the query resiliency analysis system 220 and/or other external device). The user device 210 may include a user interface where a user may enter user queries to be received, interpreted, and acted on by the virtual support agent.

The query resiliency analysis system 220 may include one or more computing devices (e.g., such as computer system/server 12 of FIG. 1) that may generate a resiliency analysis report (e.g., using the processes described herein). In embodiments, the query resiliency analysis system 220 may output the resiliency analysis report to an admin device 230.

The admin device 230 may include one or more computing devices (e.g., such as computer system/server 12 of FIG. 1) that may receive a resiliency report from the query resiliency analysis system 220. The admin device 230 may be used to modify, develop, and/or update a natural language processing algorithm used to recognize and categorize user queries received by a virtual support agent system from a user device 210. In embodiments, development and/or modifications of the natural language processing algorithm may be focused on improving the recognition of queries having low resiliency, as identified by the resiliency analysis report generated by the query resiliency analysis system 220.

The network 240 may include network nodes, such as network nodes 10 of FIG. 2. Additionally, or alternatively, the network 240 may include one or more wired and/or wireless networks. For example, the network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 240 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
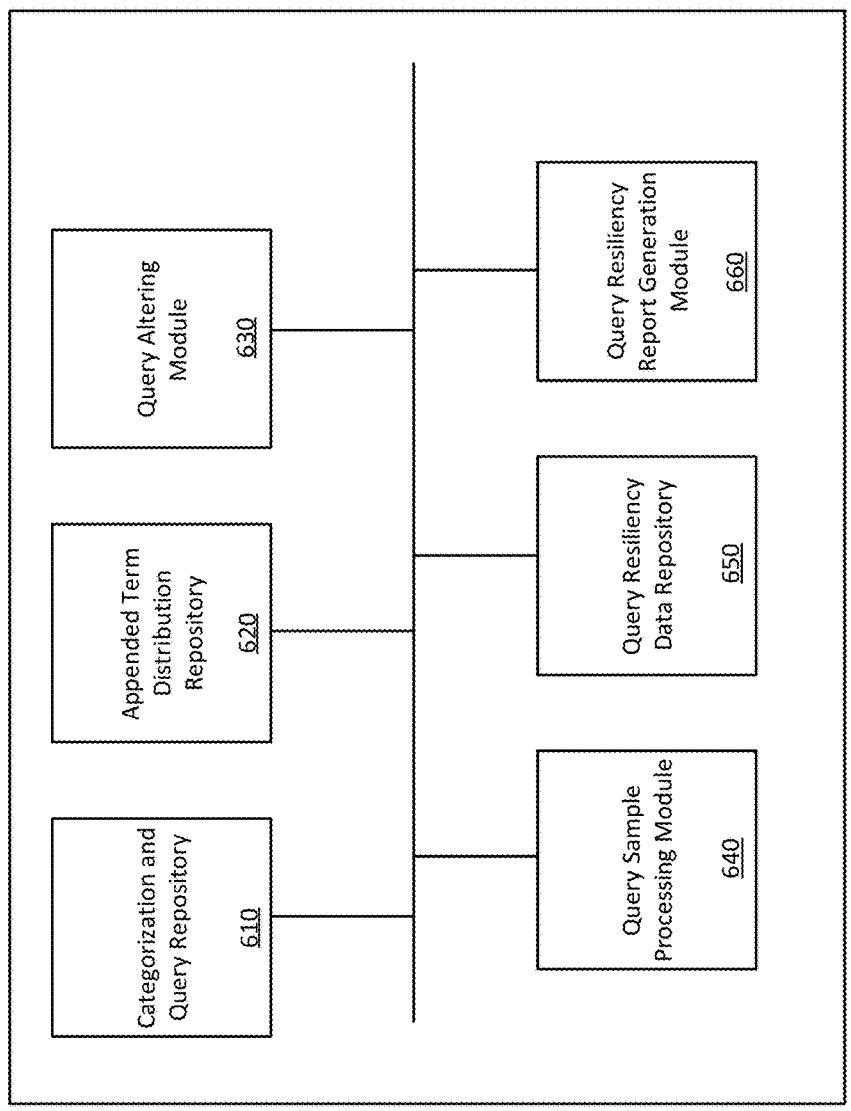
FIG. 6 shows a block diagram of example components of a query resiliency analysis system in accordance with aspects of the present invention.

FIG. 6 shows a block diagram of example components of a query resiliency analysis system 220 in accordance with aspects of the present invention. As shown in FIG. 6, the query resiliency analysis system 220 may include a categorization and query repository 610, an appended term distribution repository 620, and a query altering module 630, a query sample processing module 640, a query resiliency data repository 650, and a query resiliency report generation module 660. In embodiments, the query resiliency analysis system 220 may include additional or fewer components than those shown in FIG. 6. In embodiments, separate components may be integrated into a single computing component or module. Additionally, or alternatively, a single component may be implemented as multiple computing components or modules.

The categorization and query repository 610 may include a data storage device (e.g., storage system 34 of FIG. 1) that stores categorizations and queries to be analyzed for resiliency. In embodiments, the categorizations may include subjects or query intents associated with a user's query. The queries stored by the categorization and query repository 610 may be queries that are frequently received by a virtual support agent from user devices 210. The queries may be associated with predetermined outputs or categorizations when processed with natural language processing.

The appended term distribution repository 620 may include a data storage device (e.g., storage system 34 of FIG. 1) that stores terms that may be appended to a query (e.g., a query stored by the categorization and query repository 610) when analyzing the query's resiliency. For example, the appended term distribution repository 620 may store structural words, verbs, nouns and/or other content words that may be appended to a query when sampling the query. In embodiments, the appended term distribution repository 620 may include content words that a user may actually include as part of a user query provided to a user support agent. For example, the appended term distribution repository 620 may include content words that are frequently included in user queries having a particular categorization.

The query altering module 630 may include a program module (e.g., program module 42 of FIG. 1) that alters a query by appending a term that is stored by the appended term distribution repository 620. In embodiments, the query altering module 630 may select which terms stored by the appended term distribution repository 620 to append to the query (e.g., based on the content of the query, terms historically included when the query is received by users, etc.).

The query sample processing module 640 may include a program module (e.g., program module 42 of FIG. 1) that processes a query sample in which each query sample is a query with a predetermined classification after being altered with an appended term (e.g., by the query altering module 630). In embodiments, the query sample processing module 640 may process a query sample by performing natural language processing on the query sample, and producing an output in which the output is the recognized categorization for the query sample. The query sample processing module 640 may process multiple samples of altered queries as they are received by the query altering module 630. The query sample processing module 640 may provide the outputs of sampled queries (e.g., the determined categorizations for the sampled queries) for storage in the query resiliency data repository 650. As described herein, the processed query samples may indicate a resiliency or accuracy of the recognition of queries when those queries are altered.

The query resiliency data repository 650 may include a data storage device (e.g., storage system 34 of FIG. 1) that stores the outputs for sampled queries (e.g., queries sampled and processed by the query sample processing module 640) in a data structure. The query resiliency data repository 650 may store multiple different data structures in which each data structure includes the outputs for sampled queries associated with a single predetermined categorization. In this way, a variation percentage may be calculated for each predetermined categorization based on the number of correctly categorized sampled queries versus a total of sampled queries.

The query resiliency report generation module 660 may include a program module (e.g., program module 42 of FIG. 1) that generates a query resiliency report based on the data stored by the query resiliency data repository 650. In embodiments, the query resiliency report may identify the variance or resiliency of each categorization. The report may sort the categorizations in ascending or descending order of variance (e.g., in a table, or in a graph) such that high variance/low resiliency categorizations can be easily identified. In this way, computing resources may be directed towards the improvement of natural language processes to better recognize queries associated with high variance/low resiliency categorizations.

Figure 7:
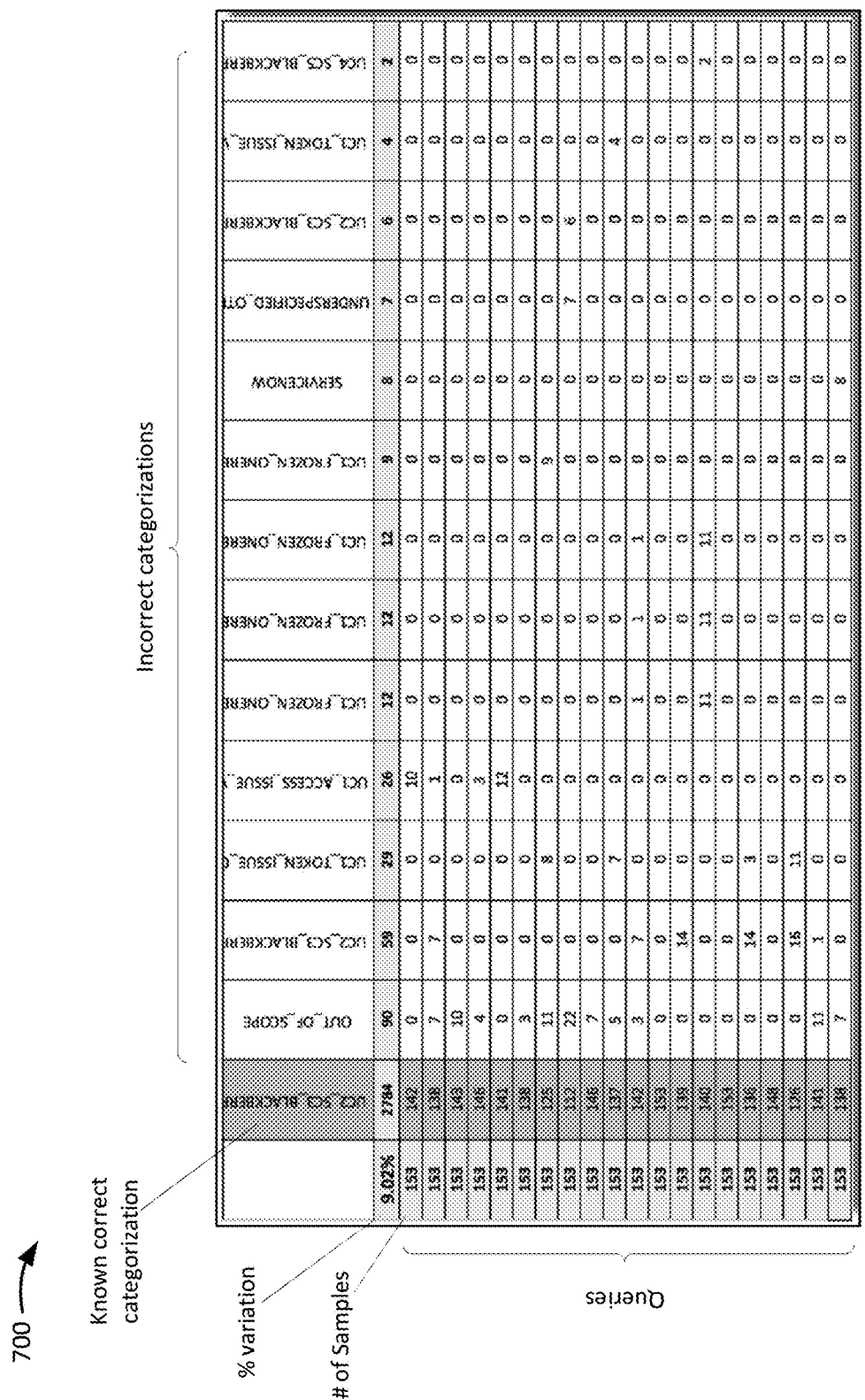
FIG. 7 shows an example data structure that stores resiliency data for a particular category in accordance with aspects of the present invention.

FIG. 7 shows an example data structure 700 that stores resiliency data for a particular category. In data structure 700, the top row identifies different categorizations that a sampled query may be categorized. The shaded categorization identifies a predetermined correct categorization for the entire data structure 700. Each row labeled "queries" signifies a query having the predetermined categorization. Each query is sampled and processed (e.g., by the query resiliency analysis system 220) a certain number of times. By way of illustrating, non-limiting example, the query may be sampled 153 times (or any other number of times). The results or output of each sampled query is tallied and stored in the data structure 700 as shown. As a specific example, the first query in the row is sampled (e.g., altered) in 153 different ways. Of those 153 samples, 142 are correctly categorized (e.g., as "UC2_SC3_BLACKBERRY"), and incorrectly categorized the remaining 11 times into different categorizations. The second query in the row is sampled in 152 different ways, and correctly categorized 138 times. As shown, a variation percentage is determined based on the data in data structure 700. In the example shown, the "UC2_SC3_BLACKBERRY" categorization has a 9.02% variation (or a 90.98% resiliency), as 2,784 out of the total number of samples (3,060) were correctly categorized. As described herein, the query resiliency analysis system 220 may generate a data structure for each categorization to calculate the variation and/or resiliency for each predetermined categorization.

Figure 8:
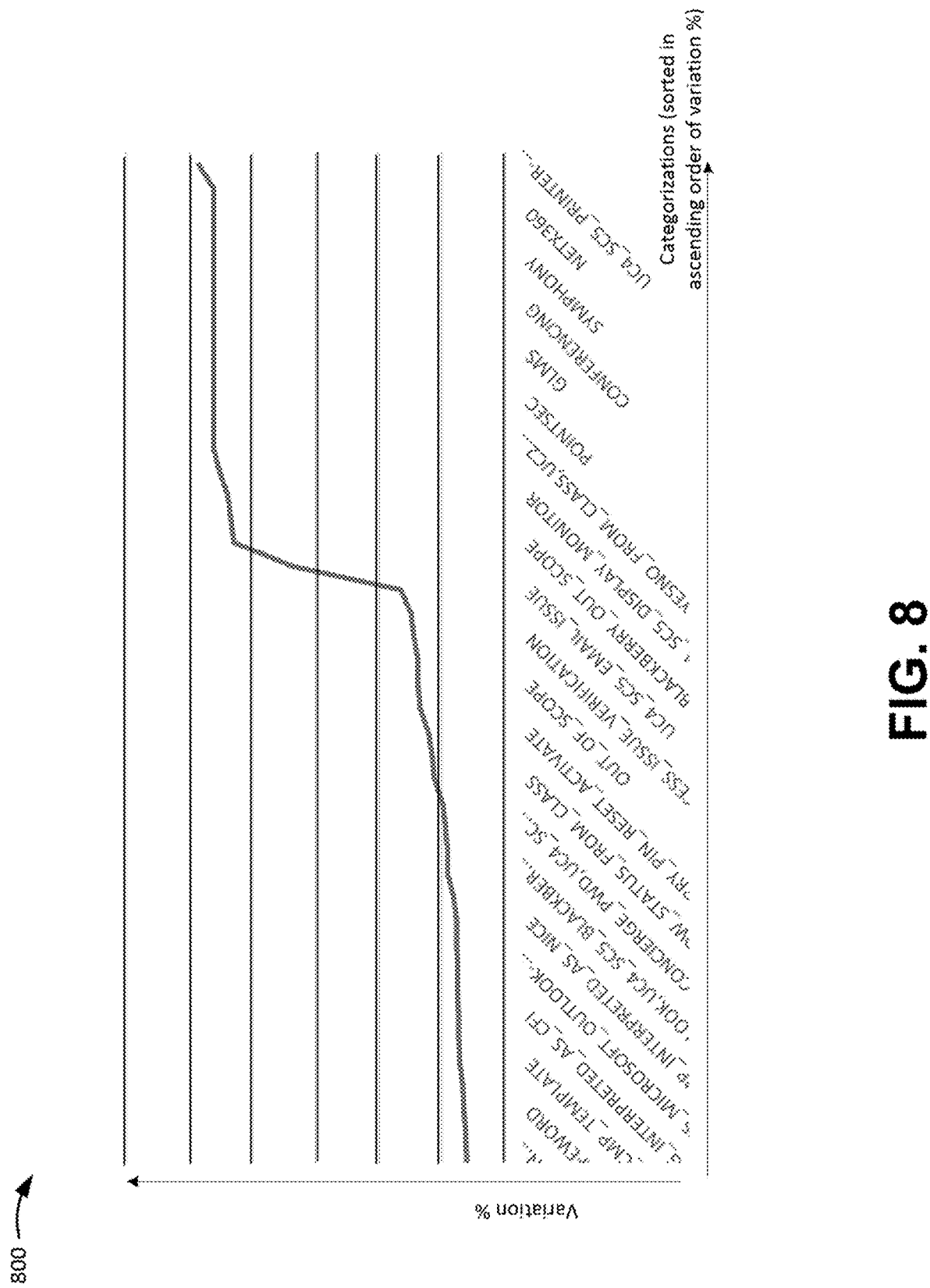
FIG. 8 shows an example of a graph representing an example resiliency analysis report in accordance with aspects of the present invention.

FIG. 8 shows an example of a graph representing an example resiliency analysis report. In embodiments, the query resiliency analysis system 220 may generate the resiliency analysis report by processing samples of queries as described herein, and based on the data stored by the query resiliency data repository 650. In embodiments, the query resiliency analysis system 220 may output the resiliency report, including a graph similar to graph 800 to the admin device 230. As shown in FIG. 8, the x-axis in the graph 800 represents different categorizations, and the y-axis represents a variation percentage for each categorization. Each data point in the graph is a variation percentage for a given category. As described herein, the variation of each category may be determined based on the data in a resiliency data structure in a similar manner as described in the example of FIG. 7. As shown in FIG. 8, the categorizations may be sorted in ascending order of variation. In this way, categorizations with a high variation and low resiliency may be easily identified and computing resources may be directed towards improving the query recognition for queries associated with high variation and low resiliency categorizations.

Figure 9:
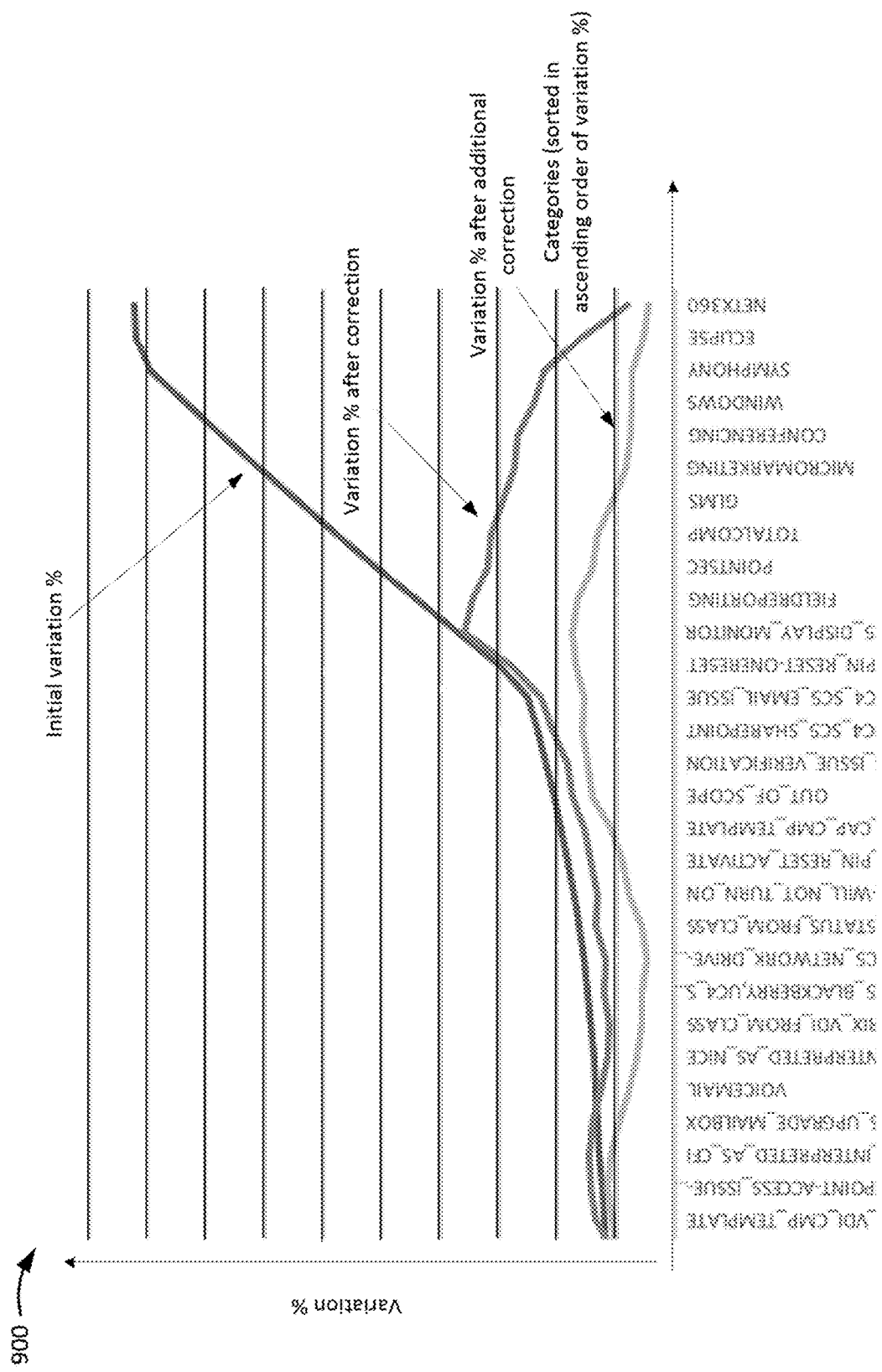
FIG. 9 shows an example of a graph representing an example resiliency analysis report after corrections to natural language processing techniques are made to high variation and low resiliency categorizations in accordance with aspects of the present invention.

FIG. 9 shows an example of a graph representing an example resiliency analysis report after corrections to natural language processing techniques are made to high variation and low resiliency categorizations. As shown in FIG. 9, initial variation percentages are determined for categories using the processes described herein as part of the generation of a resiliency analysis report. Based on identifying high variation and low resiliency categorizations, computing resources may be allocated to produce corrections, adjustments, modifications, and or further developments to natural language processing techniques associated with the recognition of queries of high variation and low resiliency categories. That is, the natural language process may be updated to better recognize low resiliency queries. In this way, the percentage of query samples that are correctly categorized by an updated natural language process is increased relative to when those samples are processed by the natural language process prior to the updates. Graph 900 in FIG. 9 shows the results of those improvements after two rounds of corrections and modifications have been made. Since computing resources are directed to correcting high variation and low resiliency categorizations, the resiliency of all categorizations can be relatively high, thus improving the overall recognition of queries received by a virtual support agent system.

Figure 10A:
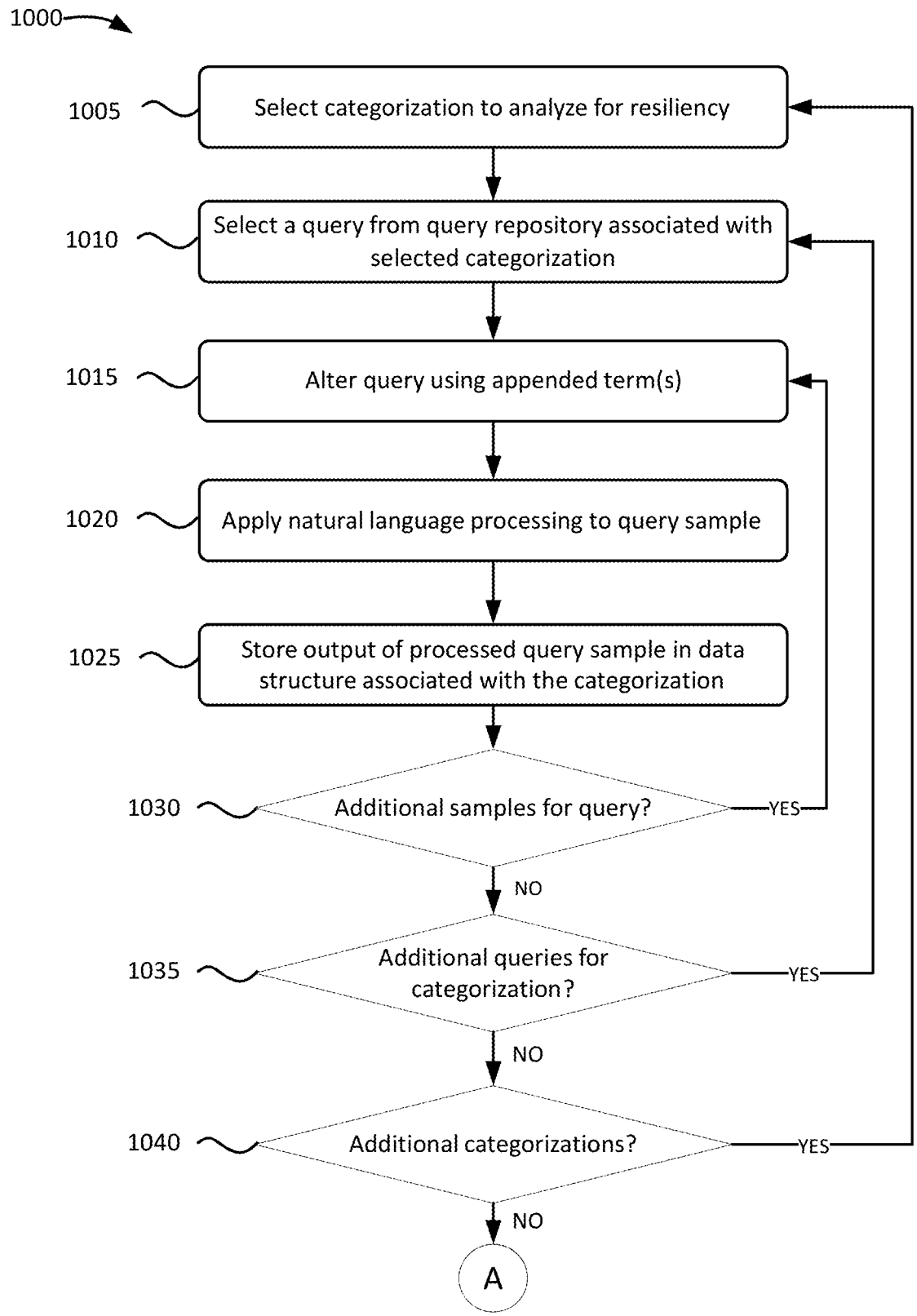
FIGS. 10A and 10B show an example flowchart of a process for generating outputting a query resiliency analysis report for targeting improvements to high variation and low resiliency categorizations in accordance with aspects of the present invention.
Figure 10B:
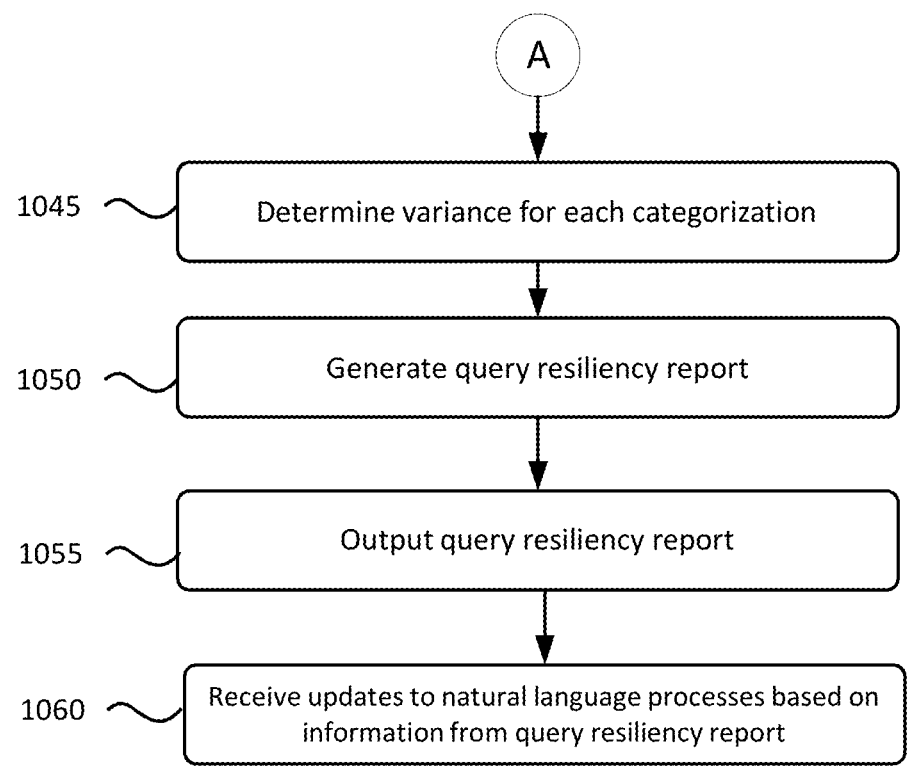

FIGS. 10A and 10B show an example flowchart of a process for generating and outputting a query resiliency analysis report for targeting improvements to high variation and low resiliency categorizations. The steps of FIGS. 10A and 10B may be implemented in the environments of FIGS. 4-6, for example, and are described using reference numbers of elements depicted in FIGS. 4-6. As noted above, the flowchart illustrates the architecture, functionality, and operation of possible implementations of systems, methods, and computer program products according to various embodiments of the present invention.

As shown in FIG. 10A, process 1000 may include selecting a categorization to analyze for resiliency (step 1005). For example, the query resiliency analysis system 220 may select a categorization from the categorization and query repository 610 to analyze for resiliency. As described herein, the categorization relates to an intent mapping for a user query.

Process 1000 may also include selecting a query from a query repository associated with the selected categorization (step 1010). For example, the query resiliency analysis system 220 may select a query associated with the categorization from the categorization and query repository 610. The selected query may map to the intent associated with the categorization selected at step 1005.

Process 1000 may further include altering the query using appended term(s) (step 1015). For example, as described above with respect to the query altering module 630, the query resiliency analysis system 220 may query altering module 630 may select a term stored by the appended term distribution repository 620 to append to the query (e.g., based on the content of the query, terms historically included when the query is received by users, etc.). In embodiments, the query resiliency analysis system 220 may select a content-based term related to the query.

Process 1000 may also include applying natural language processing to the query sample (step 1020). For example, as described above with respect to the query sample processing module 640, the query resiliency analysis system 220 may process a query sample (e.g., a query with the appended term(s) from step 1015) by performing natural language processing on the query sample, and producing an output in which the output is the recognized categorization for the query sample.

Process 1000 may further include storing the output of the processed query sample in a data structure associated with the categorization (step 1025). For example, as described above with respect to the query resiliency data repository 650, the query resiliency analysis system 220 may store the processed query sample in a data structure (e.g., in the query resiliency data repository 650). As described herein, the output indicates how the query sample is categorized and whether the query sample is categorized correctly or incorrectly. The data structure may store data indicating whether the query sample is categorized correctly or incorrectly.

As described herein, steps 1005-1025 may be repeated until all query samples for all categorizations have been processed with natural language processing, and data has been stored indicating whether each query sample is categorized correctly or incorrectly. For example, process 1000 may return to step 1015 when additional samples exist for the query (step 1030-YES), return to step 1010 when additional queries exist for the categorization (step 1035-YES), and return to step 1005 when additional categorizations exist to be analyzed for resiliency (step 1040-YES).

Once all data has been gathered for each categorization and query sample within each categorization (e.g., after no more query samples exist (step 1030-NO), after no additional queries exist for each categorization (step 1035-NO), and after no more categorizations exist (step 1040-NO)), process 1000 may proceed to step 1045 (in FIG. 10B) in which a variance is determined for each categorization. For example, the query resiliency analysis system 220 may determine the variance for each categorization (e.g., using the query resiliency report generation module 660) based on the data stored in each data structure for each categorization. More specifically, the query resiliency analysis system 220 may determine the percentage of correctly and incorrectly categorized queries (e.g., similar to the example shown in FIG. 7).

Process 1000 may further include generating a query resiliency report (step 1050) and outputting the query resiliency report (step 1055). For example, as described above with respect to the query resiliency report generation module 660, the query resiliency analysis system 220 may generate the query resiliency report based on the determined variances for each category (e.g., as determined in step 1045). Further, the query resiliency analysis system 220 may output the query resiliency report (e.g., to an admin device 230 and/or other device). The query resiliency report may identify the variance or resiliency of each categorization. The report may sort the categorizations in ascending or descending order of variance (e.g., in a table, or in a graph) such that high variance/low resiliency categorizations can be easily identified. In this way, computing resources may be directed towards the improvement of natural language processes to better recognize queries associated with high variance/low resiliency categorizations.

Process 1000 may further include receiving updates to natural language processes based on information from the query resiliency report (step 1060). For example, the query resiliency analysis system 220 may receive updates (e.g., from an administrator) to update natural language processes. The updates may be targeted to categorizations having high variance/low resiliency such that the recognition of queries associated with these categorizations are improved. In this way the query resiliency report (generated at step 1055) results in the improvement of high variance/low resiliency categorizations.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
generating, by a computing device, a sample of a query by altering the words of the query to produce the sample, wherein the query maps to a predetermined categorization;
processing, by the computing device, the sample with a first natural language process, wherein the processing produces an output comprising a categorization of the sample;
storing, by the computing device, data regarding whether the categorization of the output matches the predetermined categorization;
generating, by the computing device, a report based on the stored data indicating a percentage of a plurality of samples of the query whose categorizations match the predetermined characterization;
outputting, by the computing device, the report; and
receiving, by the computing device, a second natural language process comprising updates to the first natural language process based on the report, wherein the updates increase the percentage of the plurality of samples that match the predetermined categorization when processed with the second natural language process relative to when the plurality of samples was processed with the first natural language process.

2. The method of claim 1, wherein the altering the query includes appending a term to the query.

3. The method of claim 2, further comprising selecting the term from a database of terms associated with the categorization.

4. The method of claim 1, wherein the predetermined categorization is a first predetermined categorization, the method further comprising: processing a plurality of query samples associated with a second predetermined categorization with the natural language process to generate respective outputs indicating whether respective categorizations of each of the plurality of query samples associated with the second predetermined categorization match the second predetermined categorization.

5. The method of claim 4, wherein the report indicates a percentage of the respective categorizations of each of the plurality of query samples associated with the second predetermined categorization match the second predetermined categorization.

6. The method of claim 5, wherein the report indicates a variance of the first predetermined categorization and a variance of the second predetermined categorization, wherein the variance is sorted in ascending or descending order.

7. The method of claim 1, wherein the report is in the form of a graph or chart.

8. The method of claim 1, wherein the query relates to a user query received by a virtual agent system and the virtual agent system applies the second natural language process that is generated based on the report.

9. The method of claim 1, wherein a service provider at least one of creates, maintains, deploys and supports the computing device.

10. The method of claim 1, wherein the generating the first query sample, the processing the first query sample, the storing the data regarding whether the categorization of the first output matches the predetermined categorization, the generating the second query sample, the processing the second query sample, the storing the data regarding whether the categorization of the second output matches the predetermined categorization, the generating the report, the outputting the report, and the receiving the updates are provided by a service provider on a subscription, advertising, and/or fee basis.

11. The method of claim 1, wherein the computing device includes software provided as a service in a cloud environment.

12. The method of claim 1, further comprising deploying a system for determining resiliency of user queries in a virtual agent system, comprising providing a computer infrastructure operable to perform the generating the first query sample, the processing the first query sample, the storing the data regarding whether the categorization of the first output matches the predetermined categorization, the generating the second query sample, the processing the second query sample, the storing the data regarding whether the categorization of the second output matches the predetermined categorization, the generating the report, the outputting the report, and the receiving the updates.

13. The method of claim 1, wherein the altering the words of the query to produce the sample comprises adding one or more selected from the group consisting of: structural words; verbs; and nouns or other content words.

14. A computer program product for updating a natural language process associated with a virtual agent system based on the resiliency of user queries, the computer program product comprising a computer readable storage medium having program instructions embodied therewith, the program instructions executable by a computing device to cause the computing device to:
iteratively generate a plurality of query samples based on a query that maps to a predetermined categorization, wherein each of the query samples comprises a different altered version of the query;
process each of the plurality of query samples with a first natural language process, wherein the processing produces respective outputs comprising respective categorizations for each of the plurality of query samples;
store data regarding whether the respective categorizations for each of the plurality of query samples matches the predetermined categorization;
generate a report based on the stored data indicating a percentage of the plurality of query samples that have categorizations that match the predetermined characterization;
output the report; and
receive a second natural language process comprising updates to the first natural language process based on the report, wherein the updates increase the percentage of the plurality of query samples that match the predetermined categorization when processed with the second natural language process relative to the first natural language process.

15. The computer program product of claim 14, wherein the generating each of the plurality of query samples includes altering the query.

16. The computer program product of claim 15, wherein the altering the query includes appending a term to the query.

17. The computer program product of claim 14, wherein the predetermined categorization is a first predetermined categorization, the program instructions further cause the computing device to: process a plurality of query samples associated with a second predetermined categorization with the natural language process to generate respective outputs indicating whether respective categorizations of each of the plurality of query samples associated with the second predetermined categorization match the second predetermined categorization.

18. The computer program product of claim 17, wherein the report indicates a variance of the first predetermined categorization and a variance of the second predetermined categorization, wherein the variance is sorted in ascending or descending order.

19. A system comprising:
    a CPU, a computer readable memory and a computer readable storage medium associated with a computing device;
    program instructions to select a predetermined categorization to analyze for resiliency;
    program instructions to select a query associated with the predetermined categorization;
    program instructions to alter the query to produce a query sample;
    program instructions to apply a first natural language process to process the query sample;
    program instructions to store an output of the processed query sample as output data, wherein the output indicates whether a categorization of the processed query sample matches the predetermined categorization;
    program instructions to generate a report based on the stored output data indicating a variance for the predetermined categorization based on the output of the processed query sample and respective outputs of a plurality of other query samples associated with the predetermined categorization;
    program instructions to output the report; and
    program instructions to receive a second natural language process comprising updates to the first natural language process based on the report, wherein the updates increase the percentage of the plurality of query samples that match the predetermined categorization when processed with the second natural language process relative to the first natural language process,
    wherein the program instructions are stored on the computer readable storage medium for execution by the CPU via the computer readable memory.

20. The system of claim 19, wherein the altering the query includes appending a term to the query.

21. The system of claim 20, further comprising program instructions to select the term from a database of terms associated with the categorization.

22. The system of claim 19, wherein the predetermined categorization is a first predetermined categorization, the system further comprising: program instructions process a plurality of query samples associated with a second predetermined categorization with the natural language process to generate respective outputs indicating whether respective categorizations of each of the plurality of query samples associated with the second predetermined categorization match the second predetermined categorization.

23. The system of claim 22, wherein the report indicates a variance of the first predetermined categorization and a variance of the second predetermined categorization, wherein the variance is sorted in ascending or descending order.

24. A computer implemented method comprising:
    altering, by a computing device, a query associated with a predetermined categorization to produce a query sample;
    applying, by the computing device, first a natural language process to process the query sample;
    storing, by the computing device, an output of the processed query sample, wherein the output indicates whether a categorization of the processed query sample matches the predetermined categorization;
    generating, by the computing device, a report based on the stored data indicating a variance for the predetermined categorization based on the output of the processed query sample and respective outputs of a plurality of other query samples associated with the predetermined categorization;
    outputting, by the computing device, the report; and
    receiving, by the computing device, a second natural language process comprising updates to the first natural language process based on the report, wherein the updates increase the percentage of the plurality of samples that match the predetermined categorization when processed with the second natural language process relative to when the plurality of samples was processed with the first natural language process.

25. The method of claim 24, wherein the altering the query includes appending a term to the query.

\* \* \* \* \*